(12) United States Patent
Struijk et al.

(10) Patent No.: US 9,516,819 B2
(45) Date of Patent: Dec. 13, 2016

(54) APPARATUS AND METHOD FOR PLACING PLANT CUTTINGS AND CUTTING HOLDING UNIT FOR PLANTING CUTTINGS IN A CULTIVATION MEDIUM

(71) Applicant: IG Specials B.V., Gameren (NL)

(72) Inventors: Wim Struijk, Delwunen (NL); Wim Van Der El, Ameide (NL); Dirk Jan De Koning, Son en Breugel (NL); Willem Nicolaas Schouten, Nederhemert (NL)

(73) Assignee: IG SPECIALS B.V., Gameren (NL)

( * ) Notice: Subject to any disclaimer, the term of this patent is extended or adjusted under 35 U.S.C. 154(b) by 0 days.

(21) Appl. No.: 13/949,338

(22) Filed: Jul. 24, 2013

(65) Prior Publication Data

US 2013/0333600 A1 Dec. 19, 2013

Related U.S. Application Data

(63) Continuation of application No. PCT/EP2012/051065, filed on Jan. 24, 2012.

(30) Foreign Application Priority Data

Jan. 24, 2011 (NL) ..................................... 1038540
May 31, 2011 (NL) ..................................... 2006878

(51) Int. Cl.
*A01G 9/08* (2006.01)
*B25J 15/00* (2006.01)

(52) U.S. Cl.
CPC ............... *A01G 9/083* (2013.01); *A01G 9/085* (2013.01); *B25J 15/0028* (2013.01)

(58) Field of Classification Search
CPC .......... A01G 9/083; A01G 9/085; A01G 9/08; A01G 9/00; B25J 15/0028; B25J 15/00
See application file for complete search history.

(56) References Cited

FOREIGN PATENT DOCUMENTS

| | | |
|---|---|---|
| EP | 1442655 A1 | 8/2004 |
| EP | 1829446 A2 | 9/2007 |
| JP | 03-228607 A | 10/1991 |
| JP | 07-046942 A | 2/1995 |
| JP | 09-028187 A | 2/1997 |
| JP | 10-178893 A | 7/1998 |
| JP | 10-243735 A | 9/1998 |
| JP | 11-225585 A | 8/1999 |
| JP | 2002-176858 A | 6/2002 |
| JP | 2002233250 A | 8/2002 |

(Continued)

OTHER PUBLICATIONS

International Search Report of PCT/EP2012/051065 mailed on Jul. 2, 2012.

*Primary Examiner* — Christopher J Novosad
(74) *Attorney, Agent, or Firm* — Ramin Amirsehhi; David P. Owen; Hoyng Rokh Monegier LLP

(57) ABSTRACT

The present invention relates to an apparatus for placing cuttings of plants in a cultivation medium. The apparatus has a cuttings supply system for supplying a plurality of cuttings, a camera system for identifying cuttings among the plurality of cuttings that are suitable for individual pick up using pattern recognition, a pick-up tool for picking up cuttings identified by the camera system, and a planting system for simultaneously planting multiple cuttings in the cultivation medium. The planting system and the pick-up tool are separate entities. Furthermore, the pick-up tool is arranged for suitably placing picked-up cuttings in the planting system.

18 Claims, 7 Drawing Sheets

(56) References Cited

FOREIGN PATENT DOCUMENTS

| NL | 1012417 C | 12/2000 |
|---|---|---|
| NL | 1018273 C | 12/2002 |
| NL | 1018278 C | 12/2002 |
| WO | 9100167 A1 | 1/1991 |
| WO | 03022034 A1 | 3/2003 |
| WO | WO2006087901 A1 | 8/2006 |

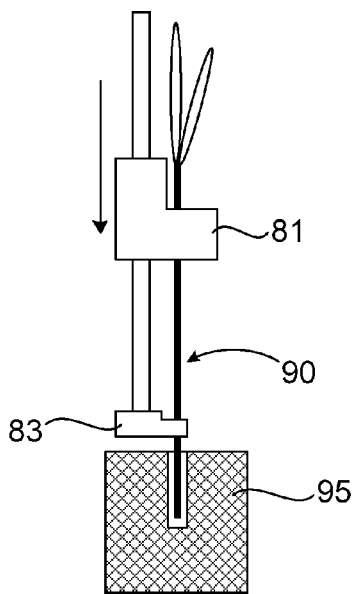
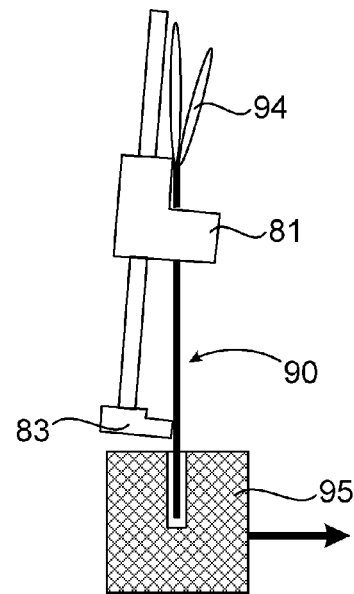
FIG. 7e    FIG. 7f
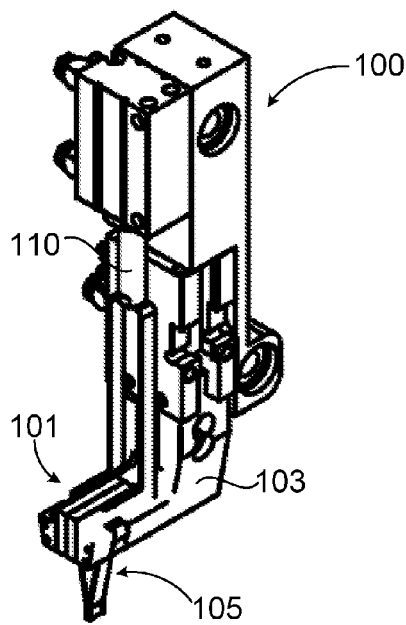
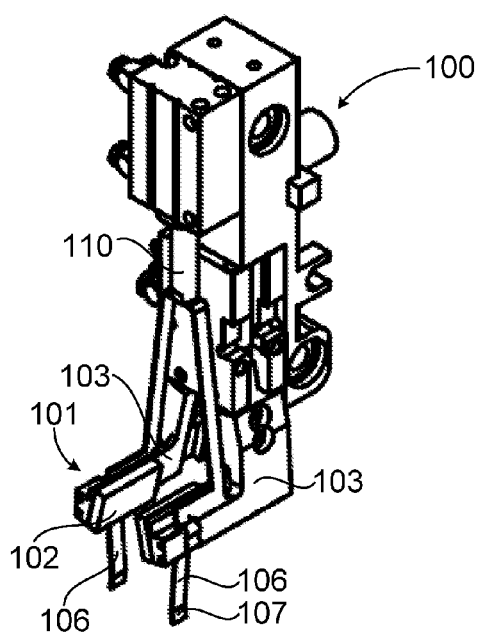
FIG. 8a    FIG. 8b

APPARATUS AND METHOD FOR PLACING PLANT CUTTINGS AND CUTTING HOLDING UNIT FOR PLANTING CUTTINGS IN A CULTIVATION MEDIUM

CROSS REFERENCE TO RELATED APPLICATIONS

This application is a continuation of PCT application number PCT/EP2012/051065 filed on 24 Jan. 2012, which claims priority from Netherlands application number NL 1038540 filed on 24 Jan. 2011 and Netherlands application number NL 2006878 filed on 31 May 2011. All applications are hereby incorporated by reference in their entireties.

BACKGROUND OF THE INVENTION

1. Field of the Invention

The invention relates to an apparatus for placing cuttings of plants in a cultivation medium. The invention further relates to a method of placing cuttings of plants in a cultivation medium as well as to a computer readable medium having computer readable instructions stored thereon for performing, when executed by a processor, such a method. The invention also relates to a cutting holding unit for planting cuttings in a cultivation medium. Furthermore, the invention relates to an apparatus for placing cuttings of plants in a cultivation medium comprising such cutting holding unit. Finally, the invention relates to a method of placing cuttings of plants in a cultivation unit using such a cutting holding unit.

2. Description of the Related Art

Nowadays, placing plant cuttings in a cultivation medium is often still done manually. Besides being time consuming, each individual person plants the cuttings in a slightly different way. Furthermore, the position and orientation of the placed cuttings may vary widely as well. As a result, besides being expensive, the propagation success rate of the cuttings is relatively unreliable.

International application WO03/022034 describes a method and apparatus for collecting cuttings from a conveyor belt and placing these cuttings in pots. The apparatus includes a pick and place tool for picking and placing plant cuttings. The tool includes an array of actuable pick-up means for picking up the cuttings and retaining these cuttings with a predetermined orientation relative to the tool. The tool furthermore comprises an array of elongated means for providing indentations in the pots. The method and apparatus provide an automatic method for picking up cuttings and placing these cuttings in pots.

However, the method and apparatus described in WO03/022034 have several disadvantages. For example, the apparatus and method described in WO03/022034 lead to a cutting placement having insufficient uniformity. Although the cuttings are said to be picked up with a predetermined orientation relative to the tool, the sequential picking of adjacent cuttings may cause the orientation of the picked cuttings with respect to the tool to change due to interaction with each other, in particular during the picking process. As a result, some cuttings are placed into the pots with an orientation different from the predetermined orientation, which results in a poorly placed cutting.

Furthermore, the arrangement and functionality of the pick and place tool causes the apparatus to operate with a limited throughput, i.e. the number of cuttings that can be placed within a specific period of time is limited.

European patent application 1829446 describes an assembly for placing cuttings in plant plugs in which individual cuttings are gripped by one of the arms of a rotating device by means of under-pressure. The cuttings are then transferred to a belt provided with grippers. This transfer movement takes place continually and in a rotating manner.

However, the assembly described in EP1829446 has several disadvantages. First, the use of a rotating device for picking individual cuttings occupies a lot of space. Furthermore, the throughput of the assembly is sensitive to logistics failure. The cuttings need to be supplied individually with a spacing between subsequent cuttings that is between very strict boundaries. For example, if the subsequent cuttings are supplied too close together, either one of the cuttings is not processed, or the rotating speed of the rotating device should be adapted, i.e. increased, to allow pick up of both cuttings. The first option would decrease the throughput, whereas the second option causes the control of the rotating device to be complex.

BRIEF SUMMARY OF THE INVENTION

It is an object of the invention to provide an alternative apparatus and method for placing plant cuttings in a cultivation medium with an improved performance, in particular with respect to throughput, precision and reliability. For this purpose, an embodiment of the invention provides an apparatus for placing cuttings of plants in a cultivation medium comprising: a cuttings supply system for supplying a plurality of cuttings; a camera system for identifying cuttings among the plurality of cuttings provided by the supply system that are suitable for individual pick up using pattern recognition; a pick-up tool for picking up cuttings identified by the camera system among the plurality of cuttings; and a planting system for simultaneously planting multiple cuttings in the cultivation medium; wherein the planting system and the pick-up tool are separate entities, and wherein the pick-up tool is arranged for suitably placing picked-up cuttings in the planting system. The use of a separate pick-up tool and planting system increases the throughput of the apparatus. While the planting tool plants one or more cuttings, the pick-up tool may already pick up new cuttings to be planted. Furthermore, simultaneously planting multiple cuttings in the cultivation medium further improves the throughput.

The planting system may comprise a planting unit for accommodating multiple cuttings in a predetermined orientation; and an indentation unit for indenting the cultivation medium before planting such that the planting unit can plant the multiple cuttings in corresponding indentations in the cultivation medium made by the indentation unit. The use of a planting unit and an indentation unit allows for planting cuttings in preformed indentations. As the indentations are made with the same system, their characteristics are known and placement of cuttings can be executed even more reliably. The planting system may comprise a frame to which the planting unit and the indentation unit are both connected. Using such frame improves the knowledge of the characteristics of the indentations and may further improve the reliability and uniformity of cutting placement.

In some embodiments, the planting system comprises a plurality of cutting clamps for clamping a portion of the cuttings at a clamping position. The pick-up tool is then arranged to place gripped cuttings in the cutting clamps such that the distance between the clamping position and a cutting end to be planted in the cultivation medium is substantially the same for each cutting. Due to the clamping at the same position with respect to the end of the cutting the depth of placement within the cultivation medium is about the same for all cuttings.

In some embodiments, the cuttings supply system comprises an irregularly moveable surface for supporting the supplied cuttings. The use of an irregularly moveable surface may improve the spreading of the cuttings, which alleviates the identification and pick-up of individual cuttings among the plurality of cuttings. The irregularly moveable surface may be moveable in dependence of one or more images obtained with the camera system. On the basis of the actual placement and orientation of cuttings in the supply system a movement program may be executed for controlling movement of the irregularly moveable surface.

Embodiments of the invention further relate to a method of placing cuttings of plants in a cultivation medium comprising: providing a plurality of cuttings via a cuttings supply system; identifying individual cuttings among the plurality of cuttings that are suitable for individual pick up by means of a camera system using pattern recognition; picking up an identified cutting with a pick-up tool and suitably placing the picked up cutting into a planting system; repeating the picking up and suitably placing until a predetermined number of cuttings is suitably placed in the planting system; and planting the placed cuttings in the cultivation medium with the planting system.

In some embodiments, the method further comprises indenting the cultivation medium. The placed cuttings are then planted in corresponding indentations within the cultivation medium. A suitable way of supplying the cultivation medium is the supply via a conveyor belt.

Embodiments of the invention further relate to a computer readable medium having computer readable instructions stored thereon for performing, when executed by a processor, a method of placing cuttings of plants in a cultivation medium as described above.

It is another object of the invention to enable automatic planting of cuttings in a cultivation medium with sufficient accuracy and throughput. For this purpose, the invention provides a cutting holding unit for planting cuttings in a cultivation medium comprising: a cutting clamp comprising two opposing members for clamping a portion of a cutting at a clamping position; and a holding device comprising two opposing members for supporting the cutting at a position closer to the cutting end that is to be put into the cultivation medium than the clamping position; wherein the cutting clamp and the holding device are connected to each other such that the opposing members of the holding device and the cutting clamp are moveable towards and away of each other simultaneously, and such that the distance between the opposing members of the cutting clamp and the opposing members of the holding device is variable. Each of the two opposing members of the cutting clamp may be provided with a substantially flat surface facing each other. Such surfaces limit the chance that cuttings are damaged during clamping.

In some embodiments, the holding device takes the form of a bend limiting element for limiting the degrees of freedom of the cutting while being clamped by the cutting clamp, the two opposing members of the bend limiting element being shaped in such a way that in a position at which the two members contact each other a hole is available between the two members. The cutting clamp may be moveable with respect to the bend limiting element.

In some other embodiments, the opposing members of the holding device are moveable towards and away from each other independently of the opposing members of the cutting clamp by variation of the distance between the opposing members of the holding device and the cutting clamp. The holding device may then take the form of a bent leaf spring, the two ends of which form the two opposing members. The leaf spring ends of the bent leaf spring may be moveable with respect to the cutting clamp by connection to an actuator-driven member.

Some embodiments of the invention further relate to an apparatus for placing cuttings of plants in a cultivation medium comprising: a cuttings supply system; a camera system for identifying cuttings provided by the supply system that are suitable for individual pick up; a pick-up tool for picking up cuttings identified by the camera system; and a planting system for planting cuttings in the cultivation medium; wherein the planting system comprises one or more cutting holding units as described above. The planting system and the pick-up tool may be separate entities, and the pick-up tool may be arranged for suitably placing picked-up cuttings in the one or more cutting holding units. The use of a pick-up tool that is separate from the planting system allows for an improved throughput. The planting system may further comprise an indentation unit for indenting the cultivation medium before planting such that the one or more cutting holding units can plant cuttings in indentations in the cultivation medium made by the indentation unit. The planting system may further comprise a frame to which the one or more cutting holding units and the indentation unit are connected.

In some embodiments of the apparatus, the pick-up tool is arranged to place picked cuttings in the cutting clamps of the one or more cutting holding units such that the distance between the clamping position and the cutting end to be put in the cultivation medium is substantially the same for each cutting.

Some embodiments of the invention relate to a method of placing cuttings of plants in a cultivation medium comprising: providing one or more cutting holding units as described above; suitably placing cuttings into the one or more cutting holding units; and planting the placed cuttings in the cultivation medium. The method may further comprise indenting the cultivation medium. The placed cuttings are then planted in the indentations within the cultivation medium.

In some embodiments of the method suitably placing comprises placing picked cuttings in the cutting clamps of the cutting holding units such that the distance between the clamping position and a cutting end to be put in the cultivation medium is substantially the same for each cutting.

BRIEF DESCRIPTION OF THE DRAWINGS

Various aspects of the invention will be further explained with reference to embodiments shown in the drawings wherein:

FIGS. 7a-7f schematically show a possible way of planting a cutting with the cutting holding unit of FIG. 6;

FIGS. 8a-8b show another cutting holding unit that may be used in embodiments of the invention.

DESCRIPTION OF ILLUSTRATIVE EMBODIMENTS

The following is a description of various embodiments of the invention, given by way of example only and with reference to the drawings.

Figure 1:
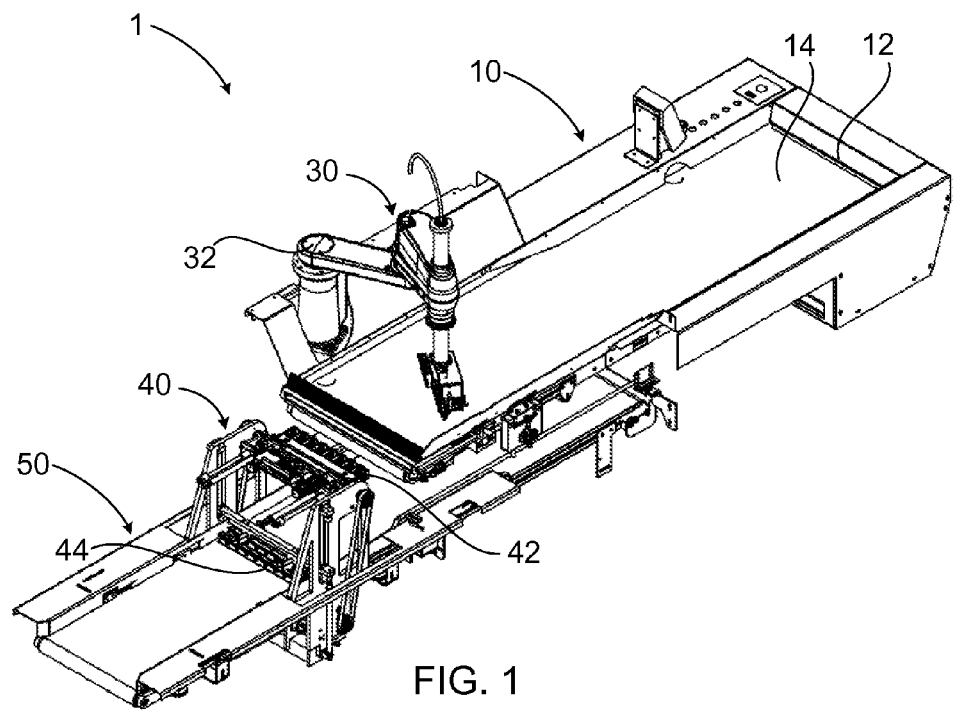
FIG. 1 shows an elevated view of an apparatus for placing plant cuttings in a cultivation unit according to an embodiment of the invention.
Figure 2:
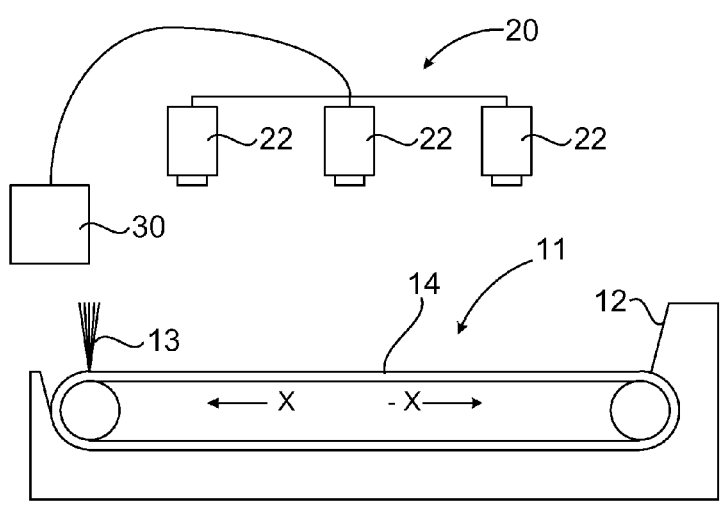
FIG. 2 schematically shows a cross-section of a portion of the apparatus of FIG. 1.

FIG. 1 schematically shows an apparatus 1 for placing cuttings of plants in a cultivation medium. FIG. 2 shows a schematic cross-section of a portion of the apparatus of FIG. 1. The basic components of the apparatus 1 will be discussed with reference to FIGS. 1 and 2.

The plant cuttings may be cuttings of any sort, and may include cuttings having a stem and one or more leafs, further referred to as stem cuttings, cuttings predominantly consisting of leafs, further referred to as leaf cuttings, as well as cuttings having a turnip further referred to as turnip cuttings. Examples of stem cuttings include, but are not limited to, cuttings of chrysanthemum, Christmas star, boxwood, flamingo flower ('anthurium'), and panda plant ('kalanchoe'). Examples of leaf cuttings include, but are not limited to, cuttings of crab cactus, and conifer. Examples of turnip cuttings include, but are not limited to cuttings of cranesbill ('geranium').

The apparatus 1 comprises a cuttings supply system 10 for supplying a plurality of cuttings. The cuttings supply system 10 may comprise a cutting inlet for enabling a supply of cuttings to the cuttings supply system. Alternatively, the cuttings may be inserted into the cuttings supply system 10 via the open top, either manually by a human operator or automatically, for example via a conveyor belt.

Preferably, the cuttings supply system 10 takes the form of a container having side walls 12 and a bottom 14. The bottom 14 supports the cuttings whereas the side walls 12 ensure that cuttings are kept within the container. A container occupies little space, which makes the apparatus 1 compact. Additionally, movement and/or installment of the apparatus 1 may be easy as well.

The apparatus further comprises a camera system 20 (only shown in FIG. 2) for identifying cuttings among the plurality of cuttings provided by the supply system 10 that are suitable for individual pick up. The camera system 20 comprises one or more cameras 22. Based on images obtained with the one or more cameras 22 cuttings that are suitable for individual pick up are identified using pattern recognition techniques. For example, in case of stem cuttings, the camera system 20 may be arranged to identify individual stems based on the recognition of a pattern corresponding to an individual stem of a stem cutting lying on the bottom of the cuttings supply system. The images provided by the camera system 20 may be any type of suitable image including 2-dimensional images and 3-dimensional images. In case of 3-dimensional imaging, the camera system 20 generally includes more than one camera 22.

The apparatus further comprises a pick-up tool 30. The pick-up tool 30 is communicatively coupled to the camera system 20 as is schematically shown in FIG. 2. The pick-up tool 30 is arranged for picking up cuttings identified by the camera system 20 among the plurality of cuttings and suitably placing picked-up cuttings in a planting system 40.

Preferably, the pick-up tool 30 is provided with one or more gripping arrangements, each gripping arrangement comprising one or more grippers. The term gripper should be understood to include any type of gripper including but not limited to mechanical grippers and suction cups. Further details with respect to grippers that may be used in embodiments of the invention will be discussed with reference to FIGS. 4a-4c.

The pick-up tool 30 may comprise a robot arm 32 with sufficient degrees of freedom to enable suitable placement of picked-up cuttings in the planting system 40. In some applications a robot arm 32 having 4 degrees of freedom, i.e. 3 rotation axes, where one axis is arranged to allow transfer along the axis (preferably in a direction substantially perpendicular to the bottom surface of the cuttings supply system) is sufficient. In some other applications a more sophisticated robot arm 32 is needed, for example a robot arm 32 capable of picking up cuttings in all kinds of three-dimensional (3D) orientations using 3D-images. Such more sophisticated robot arm 32 may be arranged to operate with 6 degrees of freedom.

The robot arm 32 is programmed to move the one or more grippers towards a suitable cutting on the bottom surface 14 of the cuttings supply system 10, and to bring the gripper in a suitable gripping position. For this purpose, the cutting position (for example using x,y-coordinates as will be understood by a person skilled in the art) and the orientation of the cutting are used as input, where these parameters are obtained using the camera system 20. Starting from this gripping position the gripper is arranged to perform a predetermined gripping action.

The planting system 40 is arranged for simultaneously planting multiple cuttings in a cultivation medium. The pick-up tool 30 may move back and forth between the cuttings supply system 10 and the planting system 40 to provide the multiple cuttings that are to be planted simultaneously. The planting system 40 may include a planting unit 42 and/or an indentation unit 44. The planting unit 42 is arranged to accommodate multiple cuttings in a predetermined orientation. The indentation unit 44 is arranged for indenting the cultivation medium, i.e. it makes holes of suitable size and shape to accommodate a cutting to be planted. The indentation unit 44 is arranged to indent the cultivation medium before the planting unit plants the cuttings in indentations made with the indentation unit. The planting unit 42 and the indentation unit 44 may be rigidly connected to each other, for example by connection to a common frame, to simplify alignment of the holes made in the cultivation medium and the components within the planting unit to arrange the planting of the cuttings.

The apparatus 1 may further comprise a cultivation medium supply unit 50 for supplying the cultivation medium. The cultivation medium may be provided in a predefined format, for example in the form of soil cubes with suitable dimensions (e.g. length×width×height of 40 mm×40 mm×30 mm). The cultivation medium may be any medium suitable for cultivating cuttings. Examples of suitable cultivation media include but are not limited to a soil block, a soil cube, rock wool, and flower soil.

The cultivation medium supply unit 50 preferably takes the form of a conveyor belt 52. The conveyor belt 52 may then be aligned with the indentation unit 44 and the planting unit 42. In some embodiments, such alignment means that the conveyor belt 52 transfers a portion of the cultivation medium that is indented by the indentation unit 44 towards a position at which the planting unit 42 can place a cutting in the hole made in the cultivation medium.

The side walls 12 and the bottom 14 may be rigid. Alternatively, at least one side wall 12 may be at least partially permeable. For example, in the embodiment shown in FIG. 2, the left side wall 12a is formed by a plurality of brushes 13. The brushes 13 may brush off debris from the picking tool 30. In particular, the robot arm 32 of the pick-up tool 30 may move the grippers through the brushes to clean the grippers after placement of cuttings in the planting system 40.

The bottom 14 may, at least partially, moveable. For example, as schematically shown in FIG. 2, at least a portion of the bottom 14 may be formed by a portion of a conveyor belt 16. In some particular embodiments the bottom surface for supporting the cuttings is an irregularly moveable surface. Further details with respect to the irregularly moveable surface will be discussed with reference to FIGS. 3a, 3b.

Figure 3A:
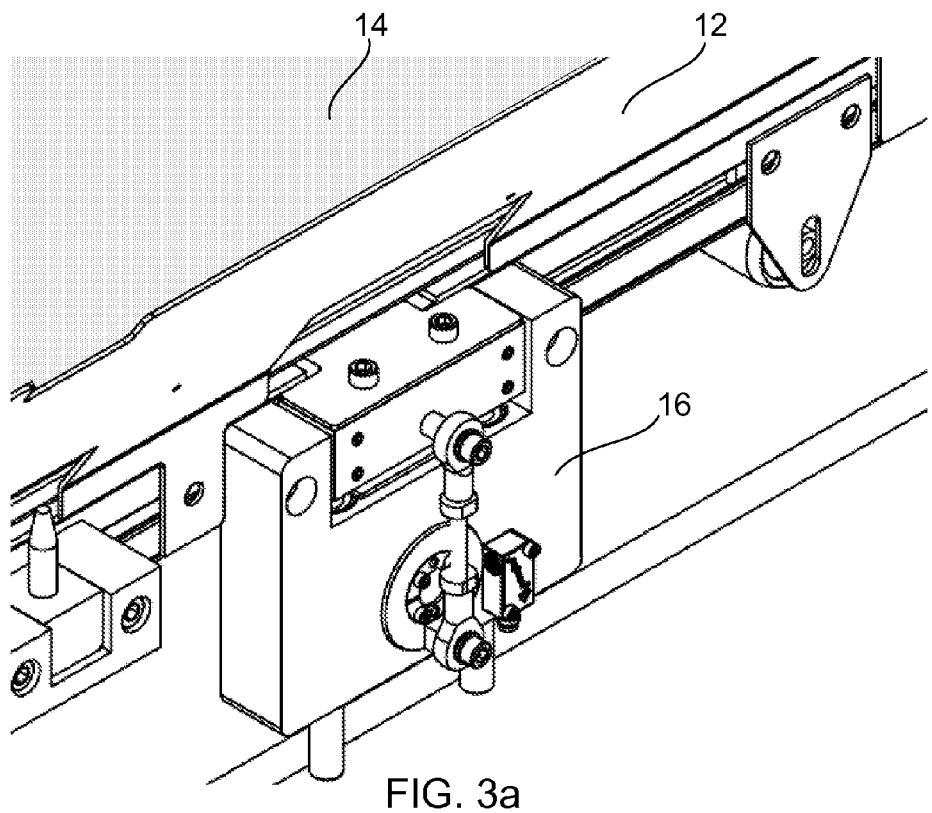
FIG. 3a shows an elevated view of a portion of the apparatus of FIG. 1.

FIG. 3a shows an elevated view of a portion of the cuttings supply system 10 of FIG. 1. In particular, FIG. 3a shows a side wall 12 of the container 11 provided with an actuator 16 for creating surface movement in a direction substantially perpendicular to the bottom surface 14 of the container 11, i.e. to create movement in a z-direction when the surface lies in an x-y plane. The actuated movement in the z-direction is preferably a non-linear movement.

Figure 3B:
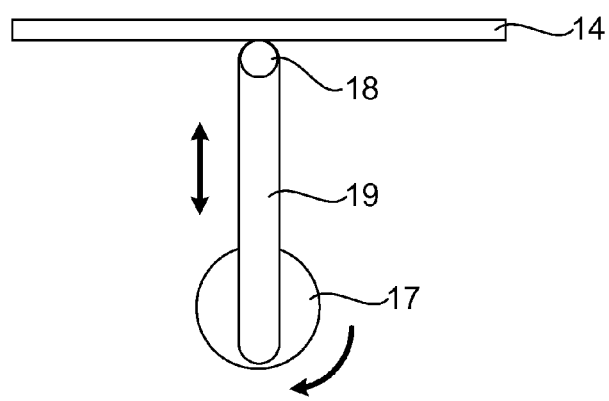
FIG. 3b schematically shows a driving mechanism for irregular movement of a surface.

FIG. 3b schematically shows the z-direction movement actuation mechanism used to obtain non-linear movement of the bottom surface in a direction substantially perpendicular thereto. In the mechanism shown in FIG. 2 a driving unit, e.g. an electromotor, is arranged to drive a drive axis 17 into a rotational motion. The drive axis 17 is connected to a bottom surface actuating structure 18, in this example a bar of which only a cross-section is shown. The actuating structure 18 may extend underneath the entire width of the bottom surface. By connecting the drive axis 17 and the actuating structure 18 with a rigid connection unit 19, the rotational motion of the drive axis 17 is converted into a movement of the actuating structure 18 in a direction substantially perpendicular to the bottom surface 14 of the container, i.e. the z-direction. As a result of the movement in the z-direction, cuttings are "shaken" and can spread out over the surface. The movement may further improve disentanglement of entangled cuttings to obtain individual cuttings suitable for planting. Note that further irregularity in the movement of the bottom surface may be obtained by using a drive axis with a non-circular cross-section, for example an elliptical cross-section.

In addition to movement in the z-direction, movements of the irregularly moveable surface may include one or more predefined in-plane movements of the complete surface. For example, as shown in FIG. 2, the entire surface is part of a conveyor belt that is moveable towards and away from the planting system (denoted with X-direction and −X-direction respectively).

By combining movement of the bottom surface 14 in an in-plane direction, and driving the actuator 16 to create movement of the bottom surface 14 in a direction substantially perpendicular thereto, irregular movement can be created in a controllable fashion. As a result of the irregular movements in both in-plane and z-directions, disentanglement of cuttings improves further, which further enhances the development of a plurality of individual cuttings within the cuttings supply system 10.

Both the surface movements and temporary surface deformations may be controllable with a control unit. The control unit can take the form of a computer or any other suitable control device known to those skilled in the art. The control unit may be instructed to execute a program. In particular, the control unit may be communicatively coupled to the camera system 20, and arranged to execute a movement program to be applied to the irregularly moveable surface in dependence of one or more images obtained with the camera system. If the camera system 20 cannot detect sufficient individual cuttings on the irregularly moveable surface, the camera system may instruct the control unit to execute the movement program.

The movement program contains computer readable instructions that may be stored on a computer readable medium. The computer readable medium having the movement program stored thereon may be provided to the control unit to perform, when executed by a processor in the control unit, the movement program for controllably moving the irregularly moveable surface as described above.

Figure 4A:
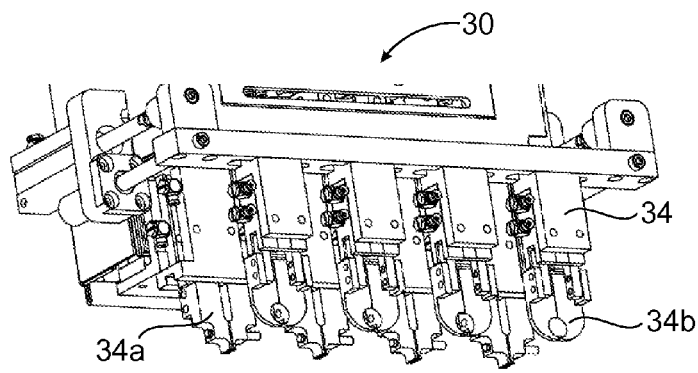
FIGS. 4a-4c show different views of an embodiment of a pick-up tool.
Figure 4B:
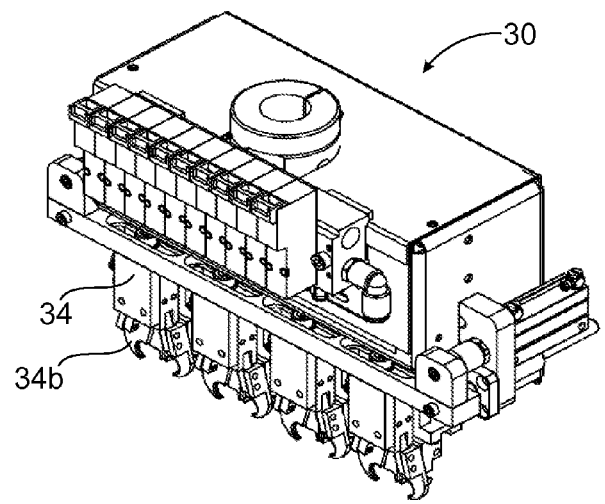
Figure 4C:
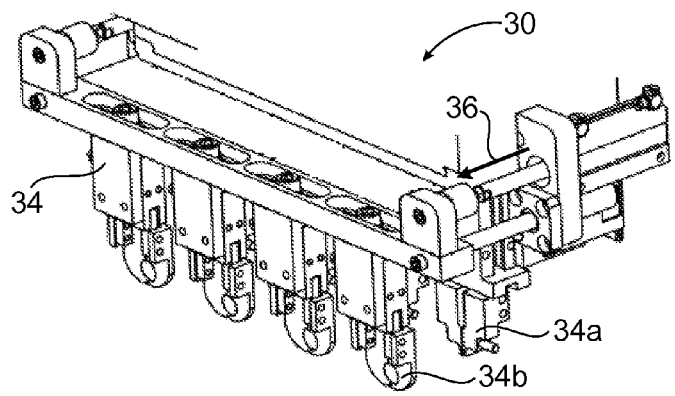

FIGS. 4a-4c show different views of an embodiment of a pick-up tool 30. The pick-up tool 30 comprises one or more gripping arrangements 34 arranged for picking up cuttings among the plurality of cuttings. In the embodiment of FIGS. 4a-4c the pick-up tool 30 comprises four gripping arrangements 34. The shown gripping arrangements 34 are particularly suitable for the picking up of stem cuttings. Stem cuttings typically include a stem portion with an end that serves as a basis for roots to be formed, and a leaf portion arranged for developing plant elements such as leafs, buds and flowers.

The gripping arrangements 34 comprise two grippers 34a, 34b. The grippers 34a are parallel grippers. The grippers 34b are angled grippers. Each gripper 34a, 34b comprises two gripping units that can move in opposing directions with respect to each other. A first gripper 34a comprises two opposing flattened gripping units arranged to grip a stem portion of a cutting. The gripping units move parallel with respect to each other. The first grippers 34a are arranged to grip the cuttings at a specific gripping position. By using the camera system 20 a suitable gripping position may be defined for each cutting. For example, the camera system 20 may define an individual cutting as a cutting for which it can identify a stem portion including the end of the stem portion. The gripping position may then be with respect to the stem portion end. An available first gripper 34a may then pick-up the identified cutting at the defined gripping position, for example a position within the stem portion that is located at a predefined distance from the stem portion end. Preferably, the pick-up tool 30 picks up four cuttings, i.e. each gripper 34 holding a cutting, before moving towards the planting system 40 for further handling.

The second gripper 34b also comprise two opposing gripping units that can move in opposing directions with respect to each other. In this case, the gripping units rotate towards and away from each other. In closed position, the gripping units of the second grippers 34b contact each other while leaving a central area open. In the case of the grippers 34b of FIG. 4b this open area is substantially circular in shape.

Preferably, the grippers 34 can be operated separately. In some embodiments the first gripper 34a and the second gripper 34b of the same gripper arrangement 34 are operated simultaneously with respect to their closed and open state, i.e. a gripping state and a non-gripping state respectively. In some other embodiments, opening and closing of the first gripper 34a is independent from opening and closing the second gripper 34b.

The gripping arrangements 34 of the pick-up tool 30 of FIGS. 4a-4c may operate in the following way in case the cuttings are stem cuttings. First, the robot arm 32 moves the pick-up tool 30 towards an identified single cutting on the basis of information obtained with the camera system 20. The grippers 34a, 34b of the gripping arrangements 34 are in an open state, i.e. a state unsuitable for gripping cuttings. FIG. 4b shows the gripping arrangements 34 in an open state. The pick-up tool 30 then picks up the cutting at a suitable gripping position with the first gripper 34a of the gripping arrangement 34. As a result the stem portion of the cutting is clamped by the first gripper 34a. Then a next cutting may be picked up by a first gripper 34a of the next gripping arrangement in a similar way as described above. The picking up of cuttings may continue until all first grippers 34a have picked up a cutting, i.e. in this case after the pick-up of four cuttings.

Subsequently, the second grippers 34b of the gripping arrangements 34 close as well, either simultaneously or a short period after the each other. The open central area within the second gripper 34b encloses the leaf portion and supports the cutting so that it does not rotate about the gripping position. The second grippers 34b then may be moved away from the first grippers 34a in a direction substantially parallel to the orientation of the cutting, schematically denoted by the arrow 36 in FIG. 4C. While moving away from the first gripper 34a the second gripper 34b forces the leaves in an orientation facing away from the stem portion. As a result of this orientation blockage by leaves in subsequent process steps, e.g. during planting, is avoided, which improves the reliability of the cutting planting process.

Note that different schemes of operation of the first grippers 34a and the second grippers 34b may be possible as well.

Generally, the pick-up tool 30 assumes that the bottom surface of the cuttings supply system 10 is at substantially the same level throughout the supply system 10. However, to ensure that local deviations from such average level do not jeopardize the performance of the gripping arrangements 34, each gripping arrangement 34 or the pick-up tool 30 may be provided with a surface detection sensor. In such case, the gripper action may involve approaching the cutting, and activate gripping upon detection of the surface. Alternatively, the robot arm 32 may place the pick-up tool 30 so close to the bottom surface 14 that the maximum distance over which the gripping arrangement 34 can move to approach the cutting is always sufficient to hit the surface. For example, if the gripping arrangement 34 can move over 40 mm, and the distance in the direction of gripper movement between the gripping arrangements 34 and the average level of the cutting supporting bottom 14 is set to 35 mm, the gripping arrangement 34 will always be able to pick-up the cutting.

Figure 5:
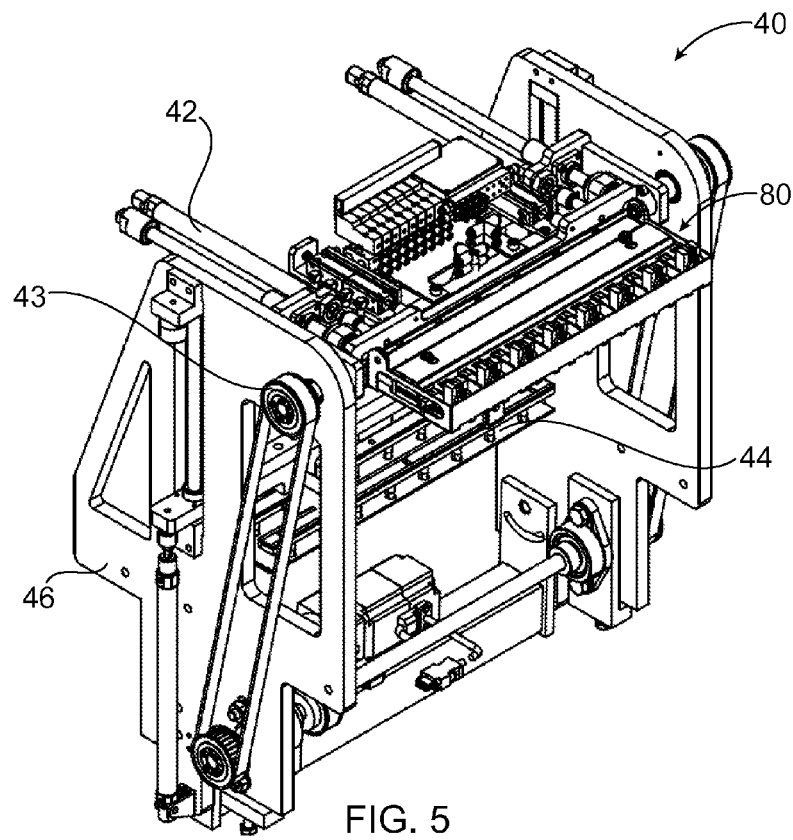
FIG. 5 shows a planting system that may be used in embodiments of the invention.

FIG. 5 shows a planting system that may be used in embodiments of the invention. The planting system comprises a planting unit 42. The planting unit 42 comprises a number of cutting holding units 80 for holding cuttings in a predefined orientation. The planting system 40 of FIG. 5 comprises eight cutting holding units 80. If cooperating with the pick-up tool 30 shown in and described with reference to FIGS. 4a-4c, the pick-up tool 30 places two times four cuttings in the planting system 40 before planting is executed. The predefined orientation in the embodiment of FIG. 5 is a substantially horizontal orientation.

The planting unit 42 is coupled to a rotation mechanism 43 which is arranged to bring the planting unit 42 into an orientation suitable for the planting of cuttings. In the planting orientation, the orientation of the cuttings is a substantially vertical orientation with the stem portion facing downwards. So, after being provided with sufficient cuttings by the pick-up tool 30, the cutting holding units 80 are rotated towards the planting orientation and the planting unit 42 is moved down for planting. Further details with respect to the cutting holding units 80 will be discussed with reference to FIG. 6.

The planting system 40 of FIG. 5 further comprises an indentation unit 44. The indentation unit is arranged for indenting the cultivation medium before planting such that the planting unit 42 can plant cuttings in indentation in the cultivation medium made by the indentation unit. The use of an indentation unit 44 simplifies the planting of cuttings. The planting of cuttings can be done with less force, which reduces the risk of damaging the cuttings during planting. Furthermore, in particular if indenting is executed in a uniform way, the cuttings are more easily placed with a uniform orientation.

The planting system 40 of FIG. 5 comprises a frame 46 to which both the planting unit 42 and the indentation unit 44 are connected in a defined way. Consequently, the planting as performed by means of the planting unit 42 can be adjusted very precisely in view of specific operational details of the indentation unit 44. Consequently, the reliability of cutting placement may be improved further.

Figure 6:
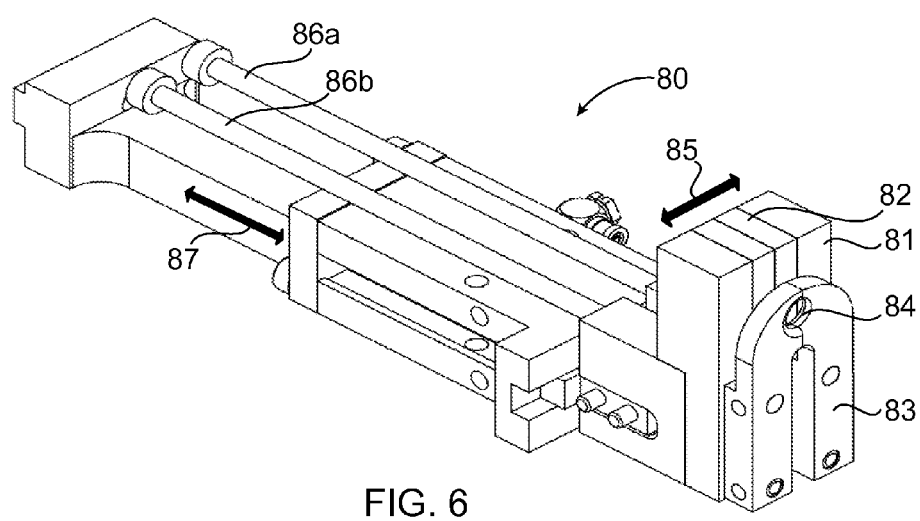
FIG. 6 schematically shows a cutting holding unit that may be used in embodiments of the invention.

FIG. 6 schematically shows a cutting holding unit 80 that may be used in embodiments of the invention. The cutting holding unit 80 of FIG. 6 comprises a cutting clamp 81 and a bend limiting element 83. The cutting clamp 81 is arranged to clamp the cutting at a clamping position, and may take the form of two opposing clamping elements provided with a flat clamping surface portion 82. The bend limiting element 83 is arranged to limit the degrees of freedom of the cutting while being clamped by the cutting clamp 81. The bend limiting element 83 comprises two opposing portions that can move away from and towards each other. The portions are shaped in such a way that in a closed position, i.e. a position at which the two portion contact each other, a hole 84 is available between the two portions. The hole is dimensioned in such a way that at least the stem of a cutting fits through the hole 84.

The two opposing elements of the cutting clamp 81 and the two opposing portions of the bend limiting element 83 can be moved away from and towards each other via rods 86a, 86b as schematically denoted by arrow 85. In addition, the cutting clamp 81 can be moved towards and away from the bend limiting element 83, schematically denoted by arrow 87. The operation of the cutting holding element 80 of FIG. 6 during the planting operation will be discussed with reference to FIGS. 7a-7f.

As discussed with reference to FIGS. 4a-4c, in some embodiments, the pick-up tool 30 is arranged to place gripped cuttings in the planting system 40 so that the clamping position of the cuttings placed in the planting unit is substantially the same for all cuttings. In case of the use of the cutting holding unit 80 of FIG. 6 this means that the pick-up tool 30 is arranged to place each cutting in a suitable cutting holding unit 80 so that the stem portion extending from the bend limiting element 83 in a direction away from the cutting clamp 81 is substantially the same for all cuttings. Typically, the length of the extended portion is about 5-20 mm, preferably 7-15 mm. Having the same clamping position makes the cutting placement in the cultivation medium more uniform. During planting all cuttings are planted at substantially the same depth as the plant depth of each cutting is limited by the bend limiting element being at the same height as the top layer of the cultivation medium in which the respective cutting is placed. An improved uniformity of the depth of planting improves the controllability of the cutting placement process, and makes the process more reliable.

The pick-up tool 30 may use one or more images obtained with the camera system 20 to determine at what position a specific individual cutting should be picked up to enable suitable placement in the planting unit. Determining the desired position of pick-up can be done by analysis using pattern recognition algorithms known to those skilled in the art.

Figure 7A:
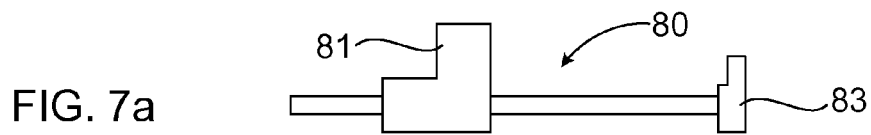
Figure 7B:
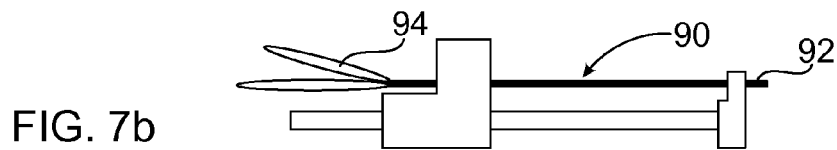

FIGS. 7a-7f schematically show a possible way of planting a cutting with the cutting holding unit 80 of FIG. 6. FIG. 7a schematically shows a side view of a cutting holding unit 80 before cutting placement by the pick-up tool. Although not visible in FIG. 7a, both the cutting clamp 81 and the bend limiting element 83 are arranged in a position suitable for receipt of a cutting. FIG. 7b shows the same cutting holding unit 80 including a suitable placed cutting 90. In FIG. 7b the cutting 90 is clamped by the clamp 81 while the stem portion of the cutting 92 penetrates through the hole of bend limiting element 83. As explained earlier, the cutting leafs 94 are oriented such that they do not interfere with the clamping.

Figure 7C:
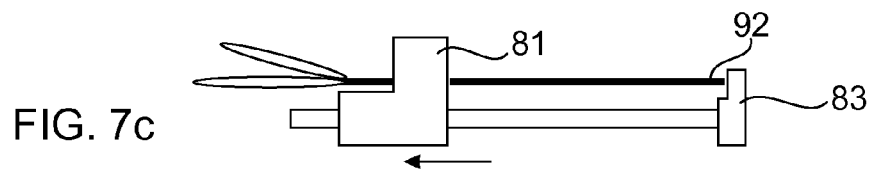

Preferably when all cutting holding units are occupied with cuttings, the cuttings can be planted by a sequence of moves schematically shown in FIGS. 7c-7f. First, as shown in FIG. 7c, the clamp 81 is moved away from the bend limiting element 83, schematically denoted by the arrow. As a result, the cutting 90 moves in the same direction. This may result in the stem portion end to be withdrawn out of the hole in the bend limiting element 83 as shown in FIG. 7c.

Figure 7D:
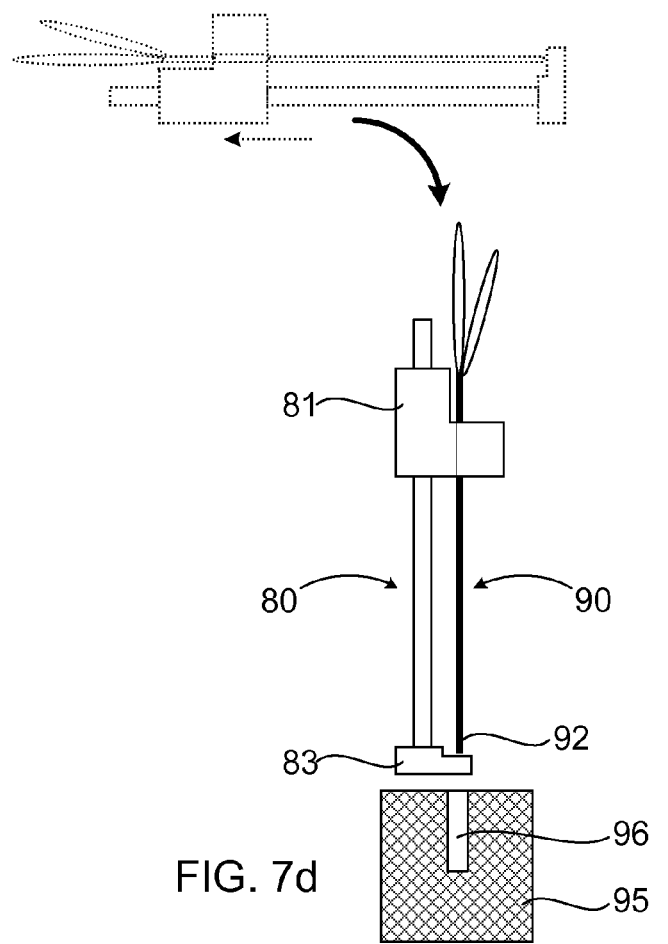

After retraction of the clamp 81 the holding unit 80 is rotated towards a substantially vertical orientation, for example by using a mechanism 43 as shown in FIG. 5. The combined retractions and rotation movement shown in FIGS. 7c and 7d reduces the risk that the stem portion end of the cutting 90 is damaged by the rotation towards the orientation suitable for planting. Preferably, as shown in FIG. 7d, a cultivation unit 95 provided with an indentation 96 is suitably placed underneath the holding unit 80 for planting purposes.

If needed, not shown in FIGS. 7a-7f, the planting unit 40 as a whole moves towards the cultivation medium 95 to allow for continuation of the planting sequence. Preferably, the height of the cultivation medium is known, so that the position of the planting system with respect to the cultivation medium is the same for all cuttings to be planted. This may be done by supplying units of cultivation medium having a fixed height. Alternatively, the height of the cultivation medium and may be measured by means known to the person skilled in the art and then adjusted to align with a predetermined height used by the planting system as its cultivation medium reference height.

When the holding unit 80 is suitably aligned with the cultivation medium 95, the clamp 81 is moved towards the bend limiting element 83 as shown in FIG. 7e. The distance over which the clamp 81 is moved is typically larger than the distance moved in the action shown in FIG. 7c. For example, the clamp 81 may move about 10 mm away from the bend limiting element 83 in FIG. 7c, while it moves about 20 mm towards the bend limiting element in FIG. 7e. By moving the clamp 81 towards the bend limiting element 83, the cutting 90 enters the indentation 96 in the cultivation medium. As the stem portion 92 of the cutting 90 moves through the hole in the bend limiting element 83, the insertion of the cutting 90 is performed in a guided fashion. The combined use of the bend limiting element 83 and the cutting clamp 81 ensures that cuttings 90 can be placed in a substantially upright position. Furthermore, contact between cuttings held by adjacent cutting holding units 80 is avoided, which improves the reliability of cutting placement.

Finally, the cutting holding unit 80 releases the cutting 90, as schematically shown in FIG. 7f. Releasing the cutting includes the opening of the cutting clamp 81 and the bend limiting element 83 combined with retraction of the cutting holding unit 80 away from the cultivation medium 95. Preferably, as shown in FIG. 7f, the cultivation medium 95 with the cutting placed therein is moved away from the cutting holding unit 80 while the cutting holding unit 80 is slightly tilted. This way of release has the advantage that the risk of pulling back and/or damaging the cutting 90 is reduced.

FIGS. 8a-8b show another embodiment of a cutting holding unit 100 that may be used in embodiments of the invention. The cutting holding unit 100 comprises a cutting clamp 101 and a holding device 105. The cutting clamp 101 is similar in nature to the cutting clamp 81 of the cutting holding unit 80 in FIG. 6. The cutting clamp 101 is arranged to clamp the cutting at the clamping position and comprises two opposing clamping members 103 provided with a flat clamping surface portion 102.

The holding device 105 comprises two opposing holding members, and is arranged to hold the cutting at a position closer to the end of its stem portion than the clamp 101. In the embodiment of FIGS. 8a, 8b, the holding device 105 takes the form of a bent leaf spring 106 in which the ends of the leaf spring 106 form the two opposing surfaces 107. Of course, different alternatives for the holding device 105 may be used as well, for example two opposing leaf springs instead of a single one that is bent in a predefined way.

The distance between the two opposing holding member surfaces 107 of the holding device 105 and the opposing surface portions 102 of the cutting clamp 101 is variable. For example, in the embodiment of FIGS. 8a, 8b, the center portion of the bent leaf spring 106 is connected to an actuator-driven member 110 that can move the holding device towards and away from the cutting clamp 101. In particular, the bent leaf spring 106 is partially guided through the opposing members 103 of the cutting clamp 101, the two opposing leaf spring ends 107 are moveable towards and away from the two opposing surface portions 102. Furthermore, since the bent leaf spring 106 is partially guided through the opposing members 103 of the cutting clamps, varying the distance between the two opposing clamp surfaces 102 results in a similar movement of the leaf spring ends 107. The ability to vary the distance between the holding device ends 107 and the opposing clamp surfaces 102 in a direction substantially parallel to the direction of the plant stem to be planted, in combination with the ability to control the opening and closing of the opposing members of the holding device 105 by similar movement of the clamp members 103 allows for very accurate and reliable planting within a limited period of time. A more detailed operation of the cutting holding element 100 of FIGS. 8a,8b during a planting process will be discussed with reference to FIGS. 9a-9d.

In some embodiments, the holding device 105 may exert less clamping strength on the cutting than the cutting clamp 101. The clamping strength is then preferably such that the holding device 105 during movement towards the cutting clamp 101 along a trajectory stays, for at least part of the trajectory, in contact with the cutting. Eventually, the movement towards the clamp 101 may be such that the cutting is only clamped by the cutting clamp 101.

As discussed with reference to FIGS. 4a-4c, in some embodiments, the pick-up tool 30 is arranged to place gripped cuttings in the planting system 40 so that the clamping position of the cuttings placed in the planting unit is substantially the same for all cuttings. In case of the use of the cutting holding unit 100 of FIGS. 8a, 8b this means that the pick-up tool 30 is arranged to place each cutting in a suitable cutting holding unit 100 so that the stem portion extending from the clamp 101 is substantially the same for all cuttings. Having the same clamping position makes the cutting placement in the cultivation medium more uniform. During planting all cuttings are planted at substantially the same depth as the plant depth of each cutting is limited by the bend limiting element being at the same height as the top layer of the cultivation medium in which the respective cutting is placed. An improved uniformity of the depth of planting improves the controllability of the cutting placement process, and makes the process more reliable.

Again, the pick-up tool 30 may use one or more images obtained with the camera system 20 to determine at what position a specific individual cutting should be picked up to enable suitable placement in the planting unit. Determining the desired position of pick-up can be done by analysis using pattern recognition algorithms known to those skilled in the art.

FIGS. 9a-9d schematically show different positions of the cutting holding unit 100 of FIGS. 8a-8b during the planting process. The movement of the planting system 40 with respect to the cultivation medium may be executed in a similar way as discussed with reference to FIGS. 7a-7f.

Figure 9A:
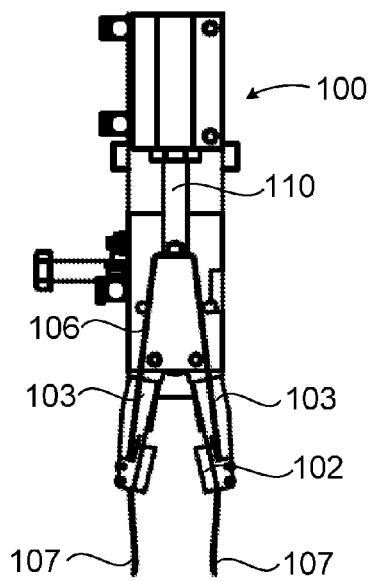
FIGS. 9a-9d schematically show different positions of the cutting holding unit of FIGS. 8a-8b during the planting process.

FIG. 9a shows a top view of the holding unit 100 in a position ready for receipt of a cutting. The actuator-driven member 110 connected to the holding device 105 is in an extended position, whereas the opposing members 103 of the cutting clamp 101 are in an open position. As a result, the two opposing ends 107 of the bent leaf spring 106 extend from the opposing surfaces 102 of the cutting clamp 101 and are also ready for receiving a cutting.

Figure 9B:
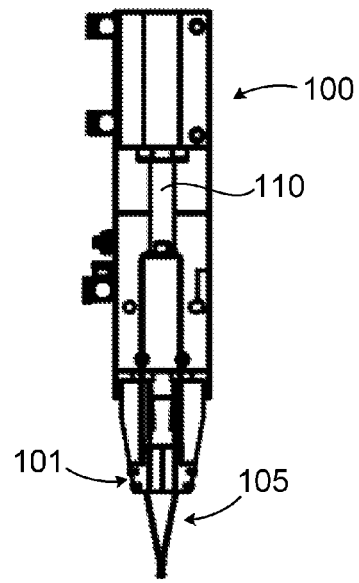
Figure 9C:
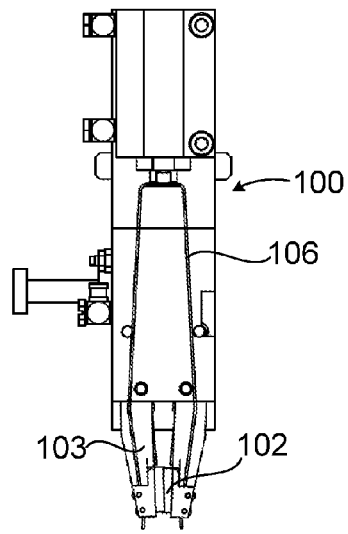

After placement of the cutting, the opposing members 103 of the cutting clamp 101 are "closed", for example by pneumatic means, such that the opposing surfaces 102 and the opposing leaf spring ends 107 move towards each other until sufficient contact with the cutting is obtained. This position, in which the cutting clamp 101 and holding device 105 are clamping and holding the cutting respectively is shown in FIG. 9b. Note that in FIG. 9b no cutting is placed between the opposing surfaces. The position of the holding unit 100 shown in FIG. 9b is used while placing the cutting directly in the cultivation medium or placing it in an indentation therein. The planting operation may be executed in a similar way as discussed earlier, and may include suitably rotation of the holding unit 100 in a way as discussed with reference to FIG. 7d.

After placement of the cutting 90, the cutting may be released in the following way. First, the actuator-driven member 110 is retracted, which results in a movement of the spring leaf ends 107 towards the cutting clamp 101. As the bent leaf spring 106 is partially guided through the opposing members 103 of the cutting clamp 101 at positions away from the opposing surfaces 102, the movement of the spring leaf ends 107 towards the cutting clamp 101 eventually also induces a movement of the opposing leaf spring ends 107 away from each other. Consequently, the holding device 105 no longer exerts a holding pressure onto the cutting, and the cutting is solely clamped by the opposing surfaces 102 of the cutting clamp 101. The situation in which the leaf spring ends 107 are fully retracted, while the opposing members 103 of the clamp 101 are still in a closed position is shown, without cutting, in FIG. 9c.

Figure 9D:
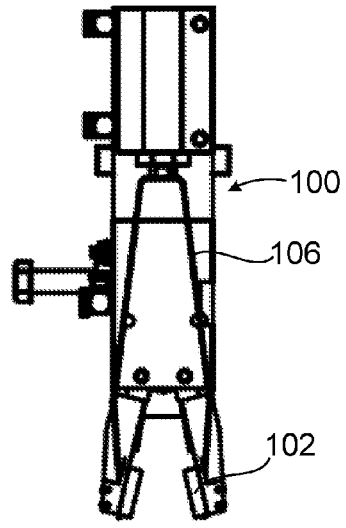

Finally, the opposing clamp members 103 of the clamp 101 are moved away from each other, which results in a full release of the cutting. Such "release position" of the holding unit 100 is shown in FIG. 9d.

After release of the cutting, the holding unit 100 may move away from the cultivation medium and be prepared for accommodation of the next cutting to be planted.

The cutting holding unit 100 of FIGS. 8a, 8b is particularly useful in case the stem is vulnerable for bending and/or when indentations in the cultivation medium are absent or insufficiently consistent in size and/or shape. Where the cutting holding unit 80 of FIG. 6 "pushes" the cutting during planting, the movement exerted on the cutting by the cutting holding unit 100 is induced by a "pull"-action of the holding device 105 in combination with the clamp 101. In this embodiment, the cutting generally extends from the lower end of the holding device 105 only a few mm, such as for example 1, 2 or 3 mm.

A method of planting cuttings in a cultivation medium that may be used in embodiments of the apparatus discussed above may take the following form.

First a plurality of cuttings is provided via a supply system, for example a supply system as shown in FIGS. 1 and 2. A camera system then identifies individual cuttings. The identified individual cuttings are then picked by a pick-up tool and suitably placed in in a planting system. Finally, the placed cuttings are planted in the cultivation medium. The method allows for automatic placement of cuttings into a cultivation medium in a highly reliable and uniform way.

Preferably, while the cuttings are being identified and placed in the planting system indentations are made in the cultivation medium by an indentation unit. Placing the cuttings in indentations reduces the risk of damaging the cuttings during the planting process.

The apparatus for placing cuttings of plants in a cultivation medium may comprise a computer system comprising a processor with peripherals to enable operation of a method of planting cuttings as described above. The processor may be connected with one or more memory units which are arranged for storing instructions and data, one or more reading units, one or more input devices, such as a keyboard, touch screen, or mouse, and one or more output devices, for example a monitor. Further, a network Input/Output (I/O) device may be provided for a connection to the networks.

The processor may comprise several processing units functioning in parallel or controlled by one main processor, that may be located remotely from one another, possibly distributed over the local area network, as is known to persons skilled in the art. The functionality of the present invention may be accomplished by a combination of hardware and software components. Hardware components, either analogue or digital, may be present within the processor or may be present as separate circuits which are interfaced with the processor. Further it will be appreciated by persons skilled in the art that software components that are executable by the processor may be present in a memory region of the processor.

Embodiments of the method may be stored on a computer readable medium, for example a DVD or USB-stick, for performing, when executed by the processor within the cutting placement apparatus, embodiments of a method placing cuttings of plants in a cultivation medium. The stored data may take the form of a computer program, which computer program is programmed to implement an embodiment of the method when executed by the computer system after loading the computer program from the computer readable medium into the computer system.

The invention has been described by reference to certain embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention, which is defined in the accompanying claims.

The invention claimed is:

1. Apparatus for placing cuttings of plants in a cultivation medium comprising:
   a cuttings supply system for supplying a plurality of cuttings;
   a camera system for identifying cuttings among the plurality of cuttings provided by the supply system that are for individual pick up using pattern recognition;
   a pick-up tool for picking up cuttings identified by the camera system among the plurality of cuttings;
   a planting system for simultaneously planting multiple cuttings in the cultivation medium, wherein the planting system and the pick-up tool are separate entities and the pick-up tool is arranged for placing picked-up cuttings in the planting system; and
   one or more cutting holding units for planting cuttings in a cultivation medium comprising a cutting clamp comprising two opposing members for clamping a portion of a cutting at a clamping position, and further comprising a holding device comprising two opposing members for supporting the cutting at a position closer to the cutting end that is to be put into the cultivation medium than the clamping position.

2. Apparatus according to claim 1, wherein the planting system comprises:
   a planting unit for accommodating multiple cuttings in a predetermined orientation; and
   an indentation unit for indenting the cultivation medium before planting such that the planting unit can plant the multiple cuttings in corresponding indentations in the cultivation medium made by the indentation unit.

3. Apparatus according to claim 2, wherein the planting unit comprises a frame, the planting unit and the indentation unit both being connected to the frame.

4. Apparatus according to claim 1, wherein the pick-up tool is arranged to place picked cuttings in the cutting clamps such that the distance between the clamping position and a cutting end to be planted in the cultivation medium is substantially the same for each cutting.

5. Apparatus according to claim 1, wherein the pick-up tool is arranged to pick up a cutting at a predetermined distance from a cutting end to be planted in the cultivation medium in dependence of one or more images obtained with the camera system.

6. Apparatus according to claim 1, wherein the cuttings supply system comprises an irregularly moveable surface for supporting the supplied cuttings.

7. Apparatus according to claim 6, further comprising a control unit for controlling a movement program to be applied to the irregularly moveable surface in dependence of one or more images obtained with the camera system.

8. Apparatus according to claim 1, further comprising a cultivation medium supply unit for supplying the cultivation medium to the planting system.

9. Apparatus according to claim 8, wherein the cultivation medium supply unit comprises a conveyor belt for supplying the cultivation medium, the conveyor belt being aligned with the indentation unit and the planting unit.

10. Method of placing cuttings of plants in a cultivation medium comprising:
    providing a plurality of cuttings via a cuttings supply system;
    identifying individual cuttings among the plurality of cuttings for individual pick up by means of a camera system using pattern recognition;
    picking up an identified cutting with a pick-up tool and placing the picked up cutting into a planting system;
    clamping the cutting with a cutting clamp of the planting system;
    holding the cutting with a holding device of the planting system; and
    planting the placed cutting in the cultivation medium with the planting system.

11. Method according to claim 10, wherein the method further comprises indenting the cultivation medium, and wherein the placed cuttings are planted in the indentations within the cultivation medium.

12. Method according to claim 10, further comprising supplying the cultivation medium via a conveyor belt.

13. Method according to claim 10, wherein the planting system comprises a plurality of cutting clamps for clamping a portion of the cuttings at a clamping position, and wherein placing comprises placing picked cuttings in the cutting clamps such that the distance between the clamping position and a cutting end to be planted in the cultivation medium is substantially the same for each cutting.

14. Method according to claim 10, wherein picking up identified cuttings comprises picking up a cutting at a predetermined distance from a cutting end to be planted in the cultivation medium in dependence of one or more images obtained with the camera system.

15. Method according to claim 10, wherein the cuttings supply system includes an irregularly moveable surface, and wherein providing cuttings includes controlling the irregularly moveable surface to obtain cuttings for individual pick up.

16. Method according to claim 15, wherein the irregularly moveable surface is communicatively coupled to a control unit provided with a movement program, and wherein controlling the irregularly moveable surface comprises activating the movement program in dependence of one or more images obtained with the camera system.

17. Computer readable medium having computer readable instructions stored thereon for performing, when executed by a processor, the method as defined by claim 10.

18. Method according to claim 10, wherein placing cuttings of plants in a cultivation comprises repeating the picking up and suitably placing until a predetermined number of cuttings is placed in the planting system.

* * * * *